Dec. 30, 1969  S. BOUDIGUES  3,486,328
MULTIFLOW TURBOJET ENGINE
Filed Dec. 15, 1967  2 Sheets-Sheet 1

INVENTOR
Serge Boudigues
BY Watson, Cole, Grindle+Watson
ATTORNEY

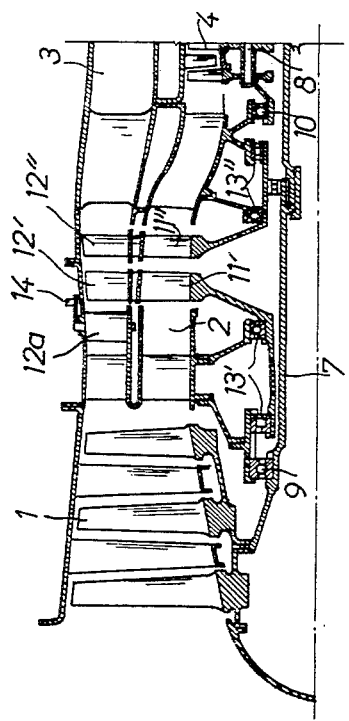
Fig.:2
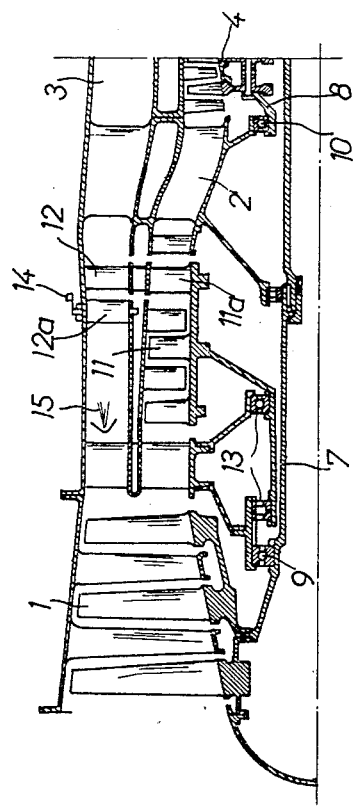
Fig.:3
INVENTOR
Serge Boudigues
BY
Watson, Cole, Grindle + White
ATTORNEY 3,486,328
MULTIFLOW TURBOJET ENGINE
Serge Boudigues, Bagneux, France, assignor to Societe
 Nationale d'Etude et de Construction de Moteurs
 d'Aviation, Paris, France
Filed Dec. 15, 1967, Ser. No. 690,950
Claims priority, application France, Jan. 11, 1967,
90,745
Int. Cl. F02k *3/06;* F04d *25/02*
U.S. Cl. 60—39.18                                6 Claims

ABSTRACT OF THE DISCLOSURE

A multiflow turbojet engine comprising, in addition to the conventional compressor set driven by its gas turbine, at least one further compressor which is mechanically independent of the said conventional set and gas turbine, this further compressor being driven by an air turbine located in the secondary flow which is brought to a pressure higher than that to which it would have been brought in a conventional dual-flow turbojet engine, the pressure excess corresponding to the expansion which takes place across the said air turbine.

---

Figure 1:
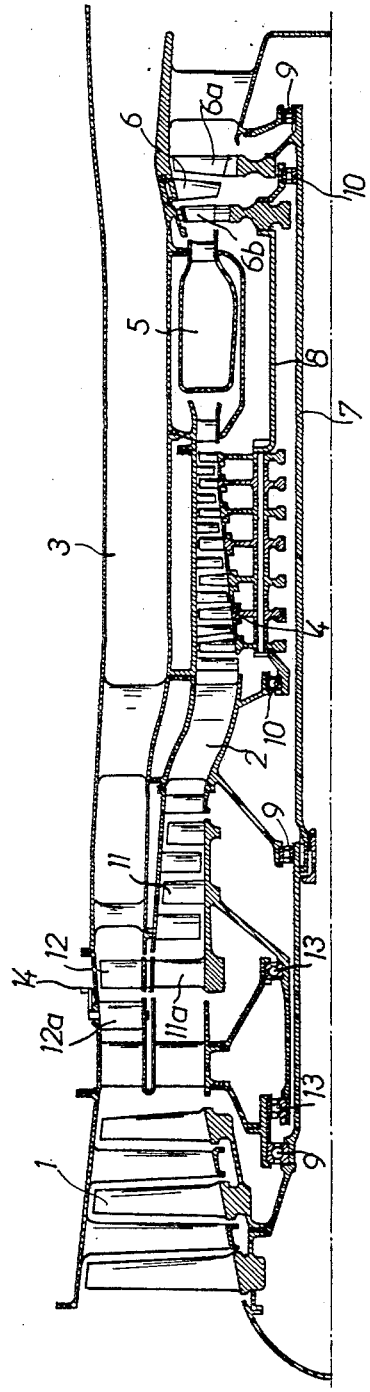

The present invention relates to turbojet engines of the kind having two or more spools and two or more motive flows in parallel, e.g. twin-spool dual-flow turbojets. Of course, while the term "dual-flow turbojet" used hereafter applies to units having two motive flows in parallel which either join before exhaust (by-pass turbojet) or exhaust separately (turbo-fan), it is not meant to exclude the presence of more than two such flows. In engines of this kind, it is usual to give the name "primary flow" to the flow compressed to the highest pressure, and the name "secondary flow" to that which is less compressed.

It is well known that progress in metallurgy has made it possible to operate at continually higher temperatures in turbines. For reasons of thermodynamics, an increase in the compression ratio is then necessary. It is also well known that it is difficult with single spool compressors, which do not have variable geometry, to go beyond a compression ratio of 5:1, and this means that for a twin-spool turbojet engine having two coaxial shafts an overall compression ratio of 25:1 is all that is attainable.

However, it is nowadays desirable in conditions of subsonic flight of aircraft and for industrial purposes, to achieve substantially higher ratios than this. Obviously, one line of approach to this end would be a turbojet engine of three-spool kind, using three coaxial shafts. However this would give rise to technical difficulties stemming from the differing speeds of rotation and the critical speeds of the shafts.

The invention proposes a solution by means of which it is possible to confine the system to only two coaxial shafts, whatever the number of compressor elements. In addition, each element has facility for adaption of its speed of rotation to the optimum desired speed for any condition of flight or use.

In accordance with the invention, the turbojet engine comprises, in addition to the conventional compressor set driven by its gas turbine, at least one further compressor which is mechanically independent of the said conventional set and gas turbine, this further compressor being driven by an air turbine located in the secondary flow which is brought to a pressure higher than that to which it would have been brought in a conventional dual-flow turbojet engine, the pressure excess corresponding to the expansion which takes place across the said air turbine.

In a preferred embodiment of the invention, the independent compressor or compressors driven by the air turbine or turbines are in the form of one or moe medium pressure compressors located between the low pressure compressor and the high pressure compressor of the dual-flow turbojet engine, and operating only in the primary flow. It may be advantageous to provide a device for heating the secondary flow upstream of the air turbine.

A preferred embodiment of the turbojet engine and two modifications thereof in accordance with the invention will now be described by way of example with reference to the accompanying drawings, in which FIGURE 1 is a schematic axial half-section of the preferred embodiment of turbojet engine, which is intended more particularly for an aircraft, and FIGURES 2 and 3 are fragmentary views similar to that of FIGURE 1, showing the two modifications.

The dual-flow turbojet engine illustrated in the drawings incorporates in a conventional manner a low pressure compressor 1 the output from which is split between an internal annular duct 2 for the primary flow and an external annular duct 3 for the secondary flow, the primary or internal duct 2 containing a high pressure compressor 4, a combustion chamber 5 and a gas turbine 6 for driving the compressor set 1, 4.

In the example illustrated, the turbojet engine is of the twin-spool kind. Thus, on the one hand, there is provided a low-pressure spool incorporating the low pressure compressor 1 and the downstream blading 6a of the turbine 6, these being connected through a shaft 7, and on the other hand a high pressure spool which incorporates the high pressure compressor 4 and the upstream blading 6b of the turbine 6, these being connected through a second shaft 8 coaxial with the first shaft 7. Bearings 9 and 10 carry the shafts 7 and 8 respectively.

In accordance with the invention the construction includes a third spool, which is mechanically independent of the two aforementioned spools. This third spool, which is for convenience referred to as the medium pressure spool, incorporates a compressor 11 and an air turbine 12, the moving blades of the latter being situated in the external or secondary duct 3 and being integral with and situated around a set of moving blading 11a on the compressor 11, which is situated in the internal or primary duct 2 upstream of the high pressure compressor 4. The medium pressure spool is carried by bearings 13.

The air turbine 12 is driven by air fed into the secondary duct 3 by the low pressure compressor 1. In order to take account of the expansion across the air turbine 12, the delivery pressure of the low pressure compressor 1 is raised to a level higher than that required prior to mixing with the primary flow (by-pass turbojet) or prior to ejection (turbo-fan).

The air turbine 12 will advantageously have a fixed diffuser 12a with variable pitch blades, the variation being controlled by means of the mechanism indicated at 14 and the variation enabling the dilution ratio to be varied within a very wide range. Closure of this diffuser associated with the turbine 12a produces a reduction in the secondary air flow and at the same time an increase in the speed or rotation of the intermediate compressor 11, i.e. an increase in the primary air flow. The dilution ratio is thus adapted to each condition of flight without producing any mismatch of the upstream and downstream compressors 1 and 4 respectively. The efficiency of the device is increased by using an ejection nozzle of variable area; however even a fixed nozzle enables matching to be achieved within a considerable range.

In the embodiment of FIGURE 1, a single medium pressure compressor set 11 has been shown. However, two or more medium compressor sets may be employed. In the modification shown in FIGURE 2, there are provided two medium pressure compressor sets 11′, 11″, each associated at the periphery with its own air turbine 12′ or 12″ driven by the secondary flow so as to rotate either in the same or in opposite directions. Bearings 13′, 13″ are provided for each of the medium pressure sets.

The cold air turbines 12 situated at the peripheries of the compressors 11 do not create any special problems as far as operating conditions are concerned, and the variable pitch blading of the stators 12a operates in a cold flow.

However, if some additional technical difficulty is accepted, it is possible to heat the secondary air in an auxiliary combustion chamber 15 (see FIGURE 3) before expanding it across the hot-air or gas turbine 12, and this enables a substantial increase in thrust to be achieved, coupled with considerable improvement in the specific fuel consumption in supersonic flight conditions.

It will be appreciated that the above described examples can be modified in various ways. In particular the compressor 4 and the corresponding set can be dispensed with, the air delivered by the compressor 11 (which will then be a high pressure compressor) being directly heated in the combustion chamber 5.

I claim:

1. A multiflow turbojet engine comprising an inner annular motive-flow duct, an outer annular motive-flow duct around said inner duct, a turbine-driven compressor set adapted for discharging a primary airflow into said inner duct and a second airflow into said outer duct, and a turbine-compressor unit mechanically independent of said turbine-driven compressor set and comprising turbine blades housed in said outer duct to be actuated by said secondary airflow discharged by said compressor set, and compressor blades driven by said turbine blades and housed in said inner duct to cooperate with said compressor set in discharging said primary airflow, both said turbine blades and said compressor blades being positioned downstream of at least a portion of said compressor set.

2. Engine a claimed in claim 1, wherein said compressor set comprises a low-pressure compressor and a high-pressure compressor spaced downstream of said low-pressure compressor and in a series-flow relation therewith, and said compressor blades being positioned between said low-pressure and said high-pressure compressors and in series-flow relation therewith, whereby said compressor blades operate as an intermediate-pressure compressor.

3. Engine as claimed in claim 2, wherein said low-pressure compressor discharges into both said inner and outer ducts and is positioned upstream of both said compressor blades and turbine blades.

4. Engine as claimed in claim 2, comprising three co-axial turbine-driven spools including respectively said low-pressure compressor, said intermediate-pressure compressor, and said high-pressure compressor, said spools being freely rotatable with respect to each other.

5. Engine as claimed in claim 1, further comprising means for heating said secondary airflow, positioned in said outer duct upstream of said turbine blades.

6. Engine as claimed in claim 1, wherein said turbine-compressor unit further comprises pivotal guide vanes in said outer duct upstream of an adjacent one of said turbine blades, and controllable means for adjusting the angular setting of said pivotal guide vanes.

References Cited

UNITED STATES PATENTS

| | | | |
|---|---|---|---|
| 2,405,919 | 8/1946 | Whittle | 60—39.18 |
| 3,368,352 | 2/1968 | Hewson | 60—226 |

FOREIGN PATENTS

| | | |
|---|---|---|
| 586,572 | 3/1947 | Great Britain. |

MARK NEWMAN, Primary Examiner

DOUGLAS HART, Assistant Examiner

U.S. Cl. X.R.

60—226; 230—116